(No Model.)
P. SEARS.
AUTOMATIC CUT-OFF.
No. 331,452.   Patented Dec. 1, 1885.
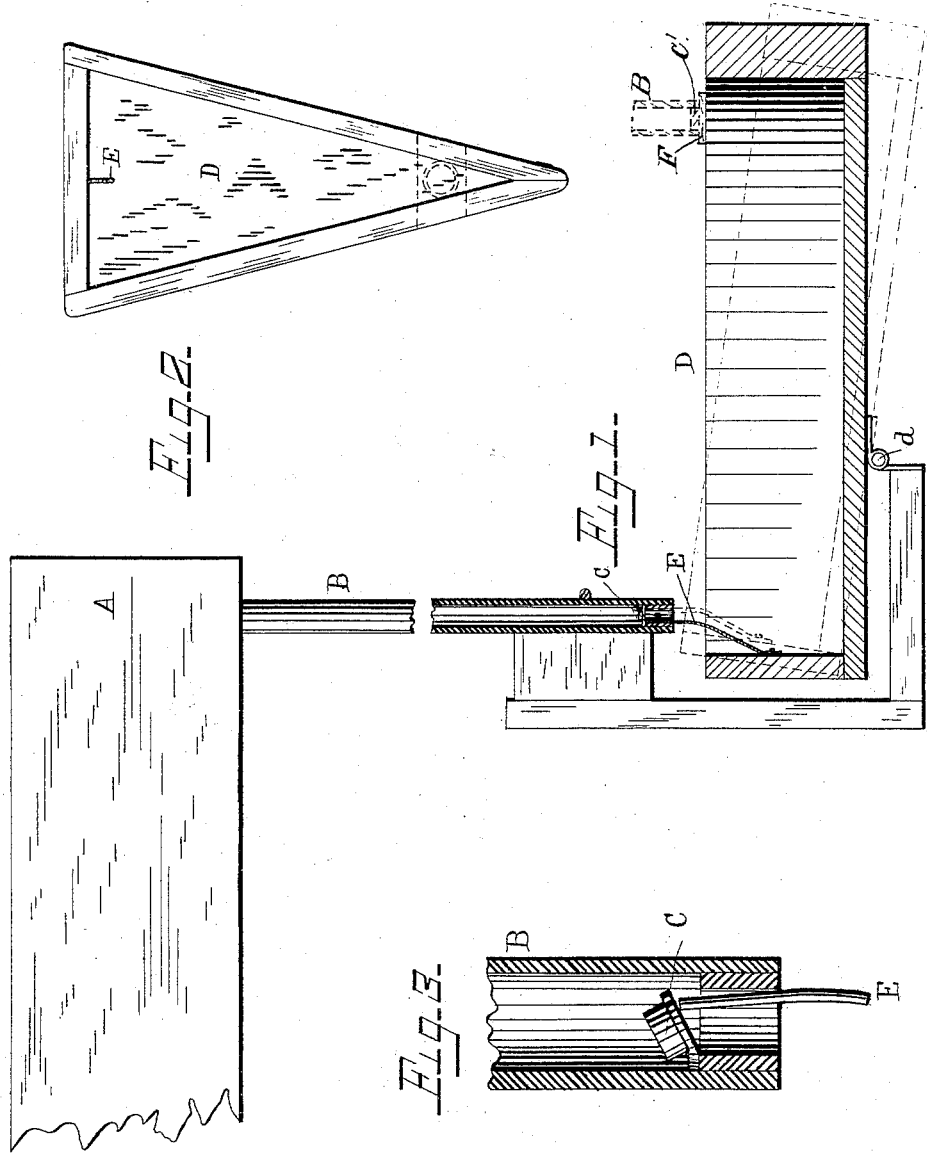
Witnesses
A. W. Bishop.
P. B. Turpin.
Inventor
Peter Sears
by R.S. & A.P. Lacey
Attys.

United States Patent Office.

PETER SEARS, OF BARNESVILLE, OHIO.

AUTOMATIC CUT-OFF.

SPECIFICATION forming part of Letters Patent No. 331,452, dated December 1, 1885.

Application filed November 14, 1884. Serial No. 147,982. (No model.)

*To all whom it may concern:*

Be it known that I, PETER SEARS, a citizen of the United States, residing at Barnesville, in the county of Belmont and State of Ohio, have invented certain new and useful Improvements in Automatic Cut-Offs; and I do declare the following to be a full, clear, and exact description of the invention, such as will enable others skilled in the art to which it appertains to make and use the same, reference being had to the accompanying drawings, and to the letters and figures of reference marked thereon, which form part of this specification.

My invention relates to water-troughs for horses, cattle, and other stock; and it consists in the novel construction, combination, and arrangement of parts by which the trough is automatically supplied with water when being emptied or when empty.

In the drawings, Figure 1 is a side view, partly in section, of my invention. Fig. 2 is a plan view of the trough. Fig. 3 is a detached section of the supply-pipe in the region of the valve.

In my invention my main object is to so construct the trough, which is pivoted, as will be presently described, that the portion on one side of its pivot will have the greatest specific gravity, while that portion on the other side of the pivot will have the greatest water-containing capacity, the full length of the trough being utilized for water-surface, so that a number of cattle or other stock may drink at the same time.

My trough, when constructed as before indicated, will give desirable results independent of any water-supply tank or reservoir, in that by tilting, when nearly empty, the water contained in it will flow to one end, so it may be more nearly emptied than if the trough were fixed or immovable; but I prefer to use the trough in connection with a water-supply tank.

The tank or reservoir A may be of any desired construction; or, when convenient, a spring or other natural water-supply may be employed instead of said tank. The discharge-tube B connects at one end with tank A, and is provided near its other end with a valve, C. This valve is preferably of the ordinary flap variety, as shown, but manifestly may be varied in form or arrangement without departing from the broad principles of my invention. The trough D is pivoted at *d* eccentrically between its ends, the pivot being nearer the rear end, as shown. This trough is made triangular in horizontal section, with the apex of the triangle at its forward end, and its water-chamber is of a corresponding shape. It will be noticed by this construction that the front end of the trough is the heavier, while its rear end has the greatest water-containing capacity. Thus when empty the forward end of the trough will fall, but when the trough becomes refilled with water it will again assume its horizontal position by reason of the excess of water in the rear end overbalancing the greater weight of the forward end. I utilize this arrangement to fill the trough when emptied by means of the rod *e*, extending from the rear end of the trough with its extremity in position to engage the valve C when the rear end of the trough is elevated. When the valve C is tripped by rod E, the water will flow from pipe B into and fill the trough, which will assume its horizontal position, and the rod E will release the valve C, which will again stop the flow of the water, and so on from time to time as the trough is emptied.

It will be understood that instead of making the forward end of the trough the heavier, as shown and described, the position might be reversed and the narrowed heavier end extended under the supply-pipe, as indicated in dotted lines on the right of Fig. 1. In such case, instead of providing a valve in the supply-pipe and a rod for tripping same, the trough might be provided with a pad or valve, C′, arranged on a bar, F, crossing the trough, and so placed that when the heavier end of the trough was raised by reason of the trough filling with water the said pad or valve would rest against and over the end of the supply-pipe B, and stop the discharge of water. This manifestly would involve no departure from the broad principle of my invention.

While I prefer to make the trough in the triangular shape shown, because same is a convenient way of securing the desired distribution of weight and water capacity, it is manifest it might be secured in various other ways—for instance, the trough might be shallowed toward its forward end so as to reduce its water-containing capacity at such point, or its side walls at such end might be made to taper inwardly toward their lower ends, or other equivalent formations might be employed without departing from the broad principles of my invention.

I am aware that tilting drinking-troughs have been constructed and unevenly balanced, the trough being arranged to actuate a valve by impingement with the valve or valve-stem during its movement, and do not claim such as my invention, for where there is no positive or direct connection between the valve or its operating-rod and the trough the supply of the trough is liable to be abnormally interrupted, and the device become inoperative, these objections are overcome by having a positive connection between the trough and the valve or the valve-operating rod.

Having thus described my invention, what I claim, and desire to secure by Letters Patent, is—

The herein shown and described automatically-supplied drinking-trough, consisting of the combination of the following elements: a triangular-shaped trough pivotally supported to one side of its center, a supply-pipe, a valve and valve-seat for regulating the passage-way through the pipe, and a connection directly attached to the trough and controlling the passage-way through the supply-pipe, substantially as described, and for the purposes specified.

In testimony whereof I affix my signature in presence of two witnesses.

PETER SEARS.

Witnesses:
R. E. SEARS,
GEO. H. COLLINS.